United States Patent [19]

Lutz

[11] 3,812,290

[45] May 21, 1974

[54] SYSTEM FOR INDICATING PARITY-DISTURBING INTERFERENCES IN TRANSMISSIONS FOR TELEPRINTERS

[75] Inventor: Roman Lutz, Munich, Germany

[73] Assignee: Siemens Aktiengesellschaft, Berlin & Munich, Germany

[22] Filed: Oct. 8, 1971

[21] Appl. No.: 187,607

[30] Foreign Application Priority Data

Nov. 16, 1970 Germany.......................... 2056278

[52] U.S. Cl.............................................. 178/23 A

[51] Int. Cl.............................................. H04l 1/10

[58] Field of Search............................ 178/23 A, 88

[56] References Cited

UNITED STATES PATENTS 2,849,532 10/1923 Hennig................................ 178/23

*Primary Examiner*—Thomas A. Robinson

*Attorney, Agent, or Firm*—Hill, Sherman, Meroni, Gross & Simpson

[57] ABSTRACT

A system for indicating parity-disturbing interferences in transmissions for teleprinters wherein the teleprinters print a special symbol to indicate such interferences including an electronic receiving circuit having electronic means for recoding received symbols which result in a non-parity condition during conversion, recoding providing a predetermined code combination for conversion by a printer into a special symbol, either a smear symbol or a space.

2 Claims, 7 Drawing Figures

INVENTOR
Roman Lutz
BY
Hill, Sherman, Meroni, Gross & Simpson
ATTYS.

INVENTOR
Roman Lutz
BY
Hill, Sherman, Meroni, Gross & Simpson
ATTYS.

INVENTOR
Roman Lutz
BY
Hill, Sherman, Meroni, Gross & Simpson
ATTYS.

INVENTOR
Roman Lutz
BY
Hill, Sherman, Meroni, Gross & Simpson
ATTYS.

INVENTOR
Roman Lutz
BY
Hill, Sherman, Meroni, Gross & Simpson
ATTYS.

INVENTOR
Roman Lutz
BY
Hill, Sherman, Meroni, Gross & Simpson
ATTYS.

SYSTEM FOR INDICATING PARITY-DISTURBING INTERFERENCES IN TRANSMISSIONS FOR TELEPRINTERS

BACKGROUND OF THE INVENTION

1. Field of the Invention

This invention relates to systems for indicating parity-disturbing interferences in signal transmissions for use by teleprinters which have means for printing a special symbol representative of a non-parity condition.

2. Description of the Prior Art

Generally, parity disturbing interferences are recorded by teleprinters as a smear symbol through the utilization of adjustment systems which operate in a fairly complex manner. At high writing speeds, for example, at about 200 Bd, these devices will fail.

SUMMARY OF THE INVENTION

Through the utilization of electronic receiving systems for teleprinters, however, it is possible, according to the present invention, to replace the erroneous symbol by a smear symbol during signal reception and while the printing operation is in progress. According to the invention, this is accomplished in such a manner that in an electronic receiving circuit, electronic means are provided for recoding any received teleprinter symbols resulting in an erroneous parity step while the conversion operation is still in progress into a predetermined code combination, and maintaining the erroneous parity step which in connection with a print converter, converts the predetermined code combination into a special symbol ("smear symbol"). By using a conventional symbol for erroneous parity or a non-parity condition for printing the smear symbol, identification of the symbol with respect to a symbol printed in response to parity and associated with the normal operation of the apparatus.

In a teleprinter having a printing operation which is independent of the transmitted symbols, a start-stop operation, this system may be so designed, according to an improvement of the invention, that an electronic parity testing system is provided for effecting an immediate recoding of the symbol into the smear symbol in response to receipt thereof by way of an electronic receiving memory and a plurality of AND gates.

For a teleprinter in which an impulse transmitter is provided and operated by a printer shaft or by a corresponding member which is releasable when the printer is operated, the system may include means for rendering the cycle of the printing operation substantially independent of the receiving operation through the provision of the impulse transmitter as a means for generating three printing pulse trains or rhythms which are phase shifted with respect to one another. The system according to another improvement utilizing such a printing rhythm control may be embodied in such a manner that an electronic control switch arrangement is designed such that an electronic parity testing system presets a parity memory stage which in turn is releasable in response to pulses of the first printer rhythm. Further, and in a manner known from the prior art, the second printer rhythm effects a transfer of the received message into an electronic intermediate memory, and the third printer rhythm effects a transfer of the data contained in the intermediate memory into an electronic printing memory and effecting release of the printing process whereby for type group alternating steps, additional gates and a pair of flip-flop stages are interposed.

BRIEF DESCRIPTION OF THE DRAWINGS

Other objects, features and advantages of the invention, its organization, construction and operation will best be understood from the following description of certain embodiments thereof taken in conjunction with the accompanying drawings, in which.

DESCRIPTION OF THE PREFERRED EMBODIMENTS

Figure 1:
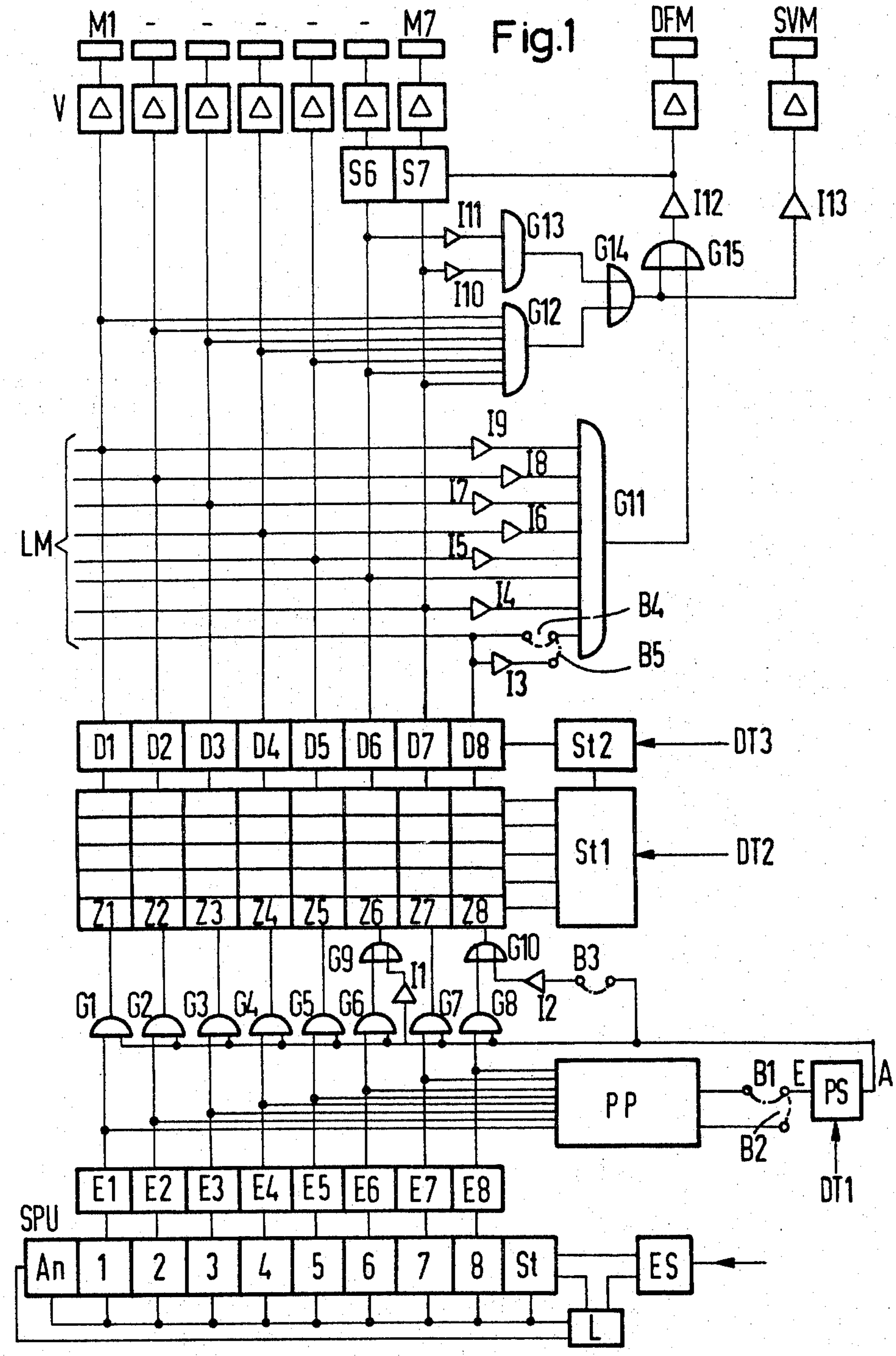
FIG. 1 is a schematic logic circuit representation of a circuit arrangement for a teleprinter having an electronic receiving system with a printing and operational control device controlled by a plurality of printer rhythms.

The circuit arrangement according to FIG. 1 is intended for a sheet teleprinter having an electronic memory system and electronic printing and operations control systems. Reference to such systems may be found in greater detail in the German Published Application 1,903,092, for example. During the operation of the printer, three consecutive printer pulses are generated which act on the control flip-flop stages. The first of these pulses DT1 effects a column feed as a function of the impression of a symbol or of a command "space" during the preceding printer cycle. The second printer pulse DT2 causes a transfer of the message from an intermediate memory E1–E8 to an electronic printer memory D1 to D8. The third printing pulse DT3 releases the impression process whereby for type group alternating steps connecting links, here in the form of gates, G13–G15 and two flip-flop stages S6, S7 are interposed. The influencing of the column feed by pulses DT1 is therefore not shown in this circuit arrangement. Rather, emphasis is placed on the circuit details for identification of the parity and the impression of the writing symbols. Basically, it is emphasized herein that the printing process thereby follows a cycle different from the receiving process. Moreover, a multi-digit intermediate memory is providing for executing the carriage return function in response to two symbols only, and there also is the aforementioned printing memory.

A series-parallel converter SPU for the starting stage An, for seven characteristic stages 1–7, for the parity stage 8, and for the blocking stage St serially accommodates incoming signals by way of a receiving circuit ES in each case and relays such signals in parallel to the receiving memory E1 to E8, which stores each symbol for the cycle of a receiver circulation. An examination for parity takes place at the output of this memory in conjunction with an electronic parity testing system PP, and a storage is accomplished by means of a parity memory stage PS which is designed as a conventional commercially available integrated construction unit, the parity memory stage being set by a pulse of the first printing rhythm DT1. Its output A provides a binary 0 for a non-parity condition to the gates G1 to G8 following the receiving memory and a binary 1 by way of an inverter I1 to an additional OR gate G9 which follows the AND gate G6 as illustrated in FIG. 1. Consequently, the space symbol is prepared at the following intermediate memory Z1 to Z8 in response to a non-parity condition. A pulse of the subsequent rhythm DT2 relays the symbol into the intermediate memory D1 to D8 by way of a shift register chain St1 acting as a control stage, the intermediate memory having a running time which varies according to the degree of loading.

A pulse of the rhythm DT3 releases the actual printing operation only by way of a control stage St2 by transferring the symbol from the intermediate memory to the printing memory D1 to D8. The symbol now is placed at the outputs of the printing memory and controls operation of the magnets M1 to M7 of the printer by way of corresponding amplifiers V.

The interposed decoding circuit now controls the release of the printer by way of the printer release magnet DFM. Three different evaluations are essential for the function of the circuit:

a. for symbols in the command block (gate G13 via inverters I10, I11)
b. for the symbol "delete" (gate G12)
c. for the symbol "space with correct parity" (gate G11 via inverters 14 to 19, and possibly 13).

The gates G12, G13 are combined by way of an OR gate G14 and in case of command or the symbol "delete" block the printing release by way of a gate G12 and an inverter I12. No impulse is produced at the output of the inverter I12 in both cases; two additional memory stages S6, S7 for the type group change magnets M6, M7 remain in the position set previously. No control of the column feed magnet SVM takes place via the inverter I13 since the output of the gate G14 does not, in such a case, provide a binary 1.

Space with correct parity also produces a binary 1 at the gate G15; there will be no print release, but the column feed magnet SVM is not blocked.

Space with wrong parity or non-parity does not differ from a printable symbol, in that the parity bit 8 at the gate G11 is coevaluated. A print release will occur and the type group change memory stages S6 and S7 transfer the signals forcibly set by way of the gates G7, G9. Thus, all preparations are made for printing a smear symbol in case of parity errors. Odd or even parity can be set by way of bridges according to the following: For even number parity, the bridges B2 and B4 are connected; for odd number parity, the bridges B1, B3 and B5 are connected.

In the last-named case, inverters I2 and I3 and the gate G10 are also effective.

If necessary, a receiving punch may be connected with eight punching magnets by way of the conductors LM. In this way, it is possible to record by punching the parity error bit in addition to the space symbol so that any possible errors in the message are easily recognized in a punched tape of this kind.

Figure 2:
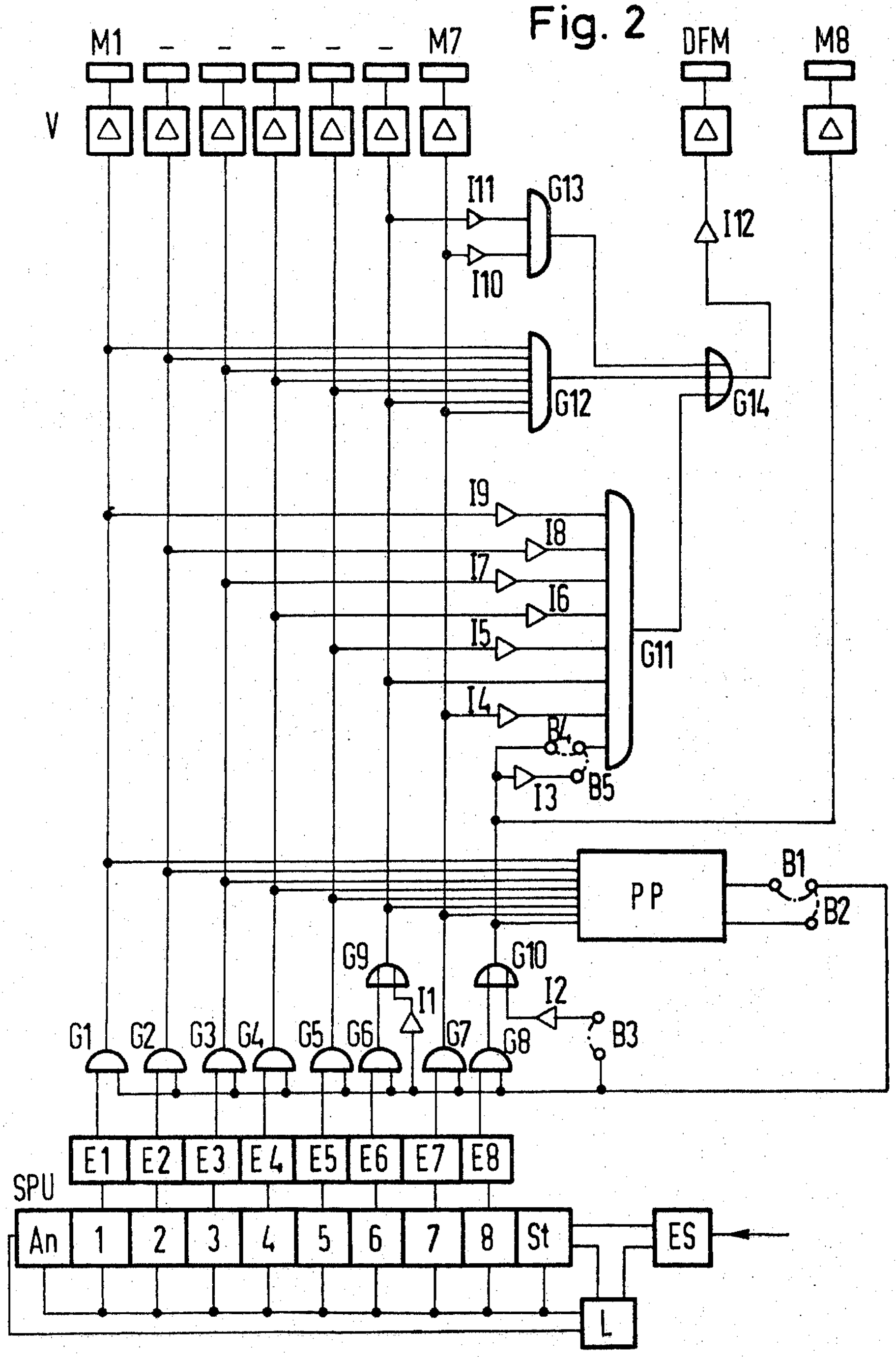
FIG. 2 is a schematic logic diagram of a circuit arrangement for a teleprinter having a printer which operates as a function of the transmitted teleprinter symbols in a start-stop mode of operation.

The circuit arrangement according to FIG. 2 is intended for a teleprinter system likewise operating with a seven code and an eighth stage as a parity stage, whose receiving machine, in contrast to that of the apparatus of FIG. 1, has neither an intermediate memory nor a printing memory. The associated printer operates in a start-stop mode. Accordingly, rhythms DT1, DT2, DT3 derived from the printer are eliminated. It is moreover assumed that the machine is equipped with a mechanical decoding system for symbols to be printed. As in the first example, electronic decoding systems are provided for special functions and the printer obtains its release by way of a separate magnet DFM.

The teleprinter symbol received remains for about 20 ms in the receiving memory E1 to E8. The message is switching through at once to the printing magnets M1 to M7. Evaluation of parity takes place only at the outputs of the gates G1 to G10. This signifies, in particular for a design with highly integrated metal-oxide-silicon transistors, a considerable advantage. If there is parity error, the output of the parity testing system PP becomes a binary 0 and forces a recoding of the corresponding teleprinter symbol into a "space" symbol with parity error, which symbol is relayed by the gates G1 to G10 to the amplifiers V and the aforementioned magnets M1 to M7. Running time effects occurring with the recoding in the gate circuits can be impeded by the interposition of a parity memory stage corresponding to the parity memory stage PS of FIG. 1. Very short erroneous impulses to the amplifiers, which are inevitable and produced during the recording and corresponding to the adulterated symbol having parity error are harmless because of the inertia encountered during the setting of the magnets.

Further decoding is accomplished in a simple manner. Space symbols with correct parity (evaluated by the gate G11), "delete" and the customary command block are consolidated through the provision of the OR gate G14 and block the print release.

A space symbol with parity error results in the desired smear symbol and is treated like a normal printing symbol.

Figure 3:
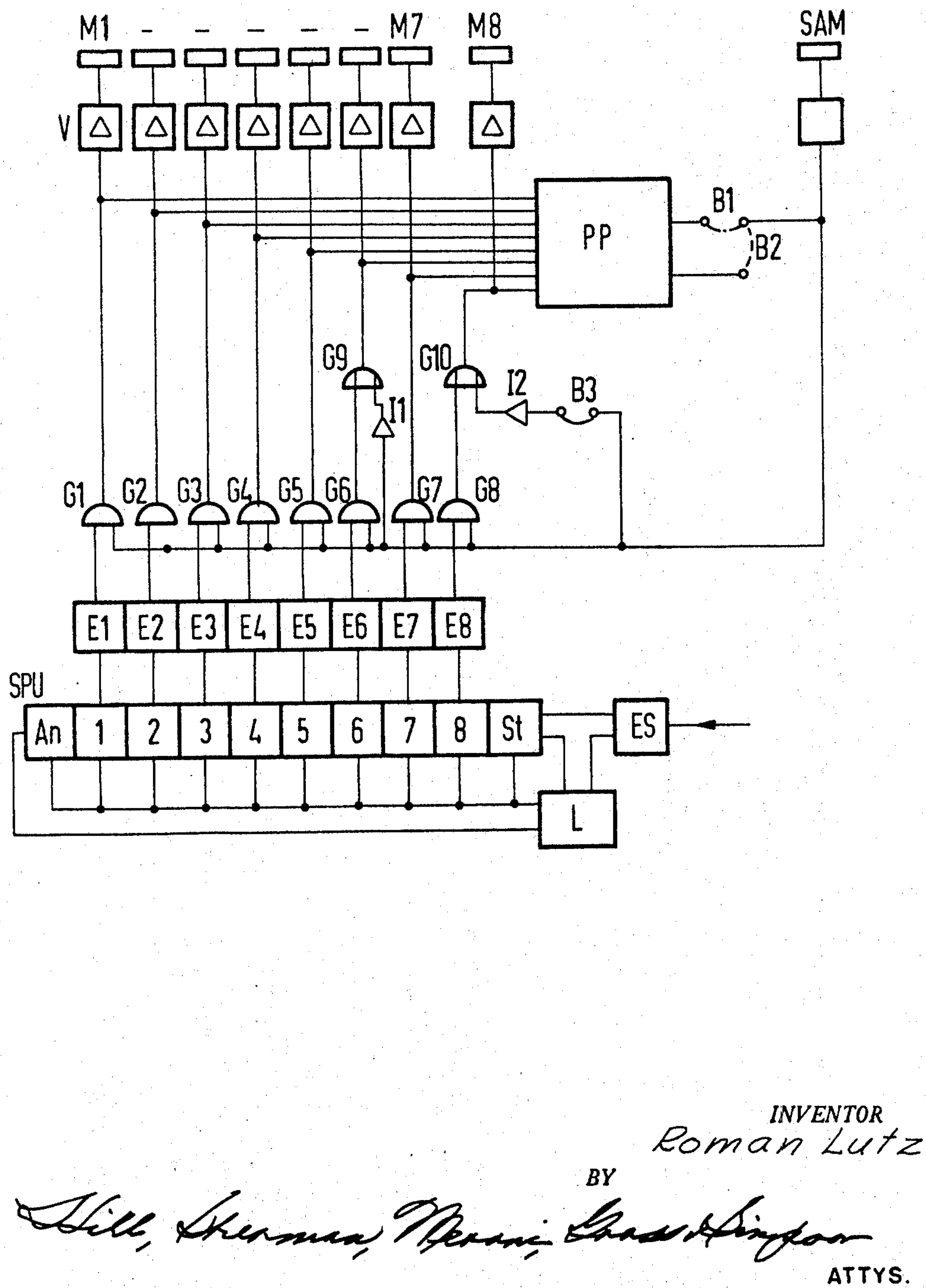
FIG. 3 is a schematic logic diagram of a circuit arrangement variation of the arrangement illustrated in FIG. 2.

In the circuit arrangement according to FIG. 3, merely the electronic decodings are eliminated from the circuit illustrated in FIG. 2. Mechanical decodings are provided exclusively for the printer functions. The printer receives its printer release only when printing a smear symbol by way of a separate magnet DFM. A separate magnet SAM is required for printing a smear symbol whose switching criteria is derived at once from the condition of the parity testing system PP. The setting of the desired type group surface is accomplished by way of the gate G9 in the same manner as the circuits illustrated in FIGS. 1 and 2.

For the arrangements according to FIGS. 2 and 3, it is assumed that the magnets M1 to M7 can be effective simultaneously for the printer and for an annexed punch. When utilizing an annexed punch, an eighth magnet is provided in each case for the parity stage. In the arrangements according to FIGS. 2 and 3, bridges B1 and B3 are connected for odd number parity and the bridge B2 is connected for even numbered parity.

Figure 4:
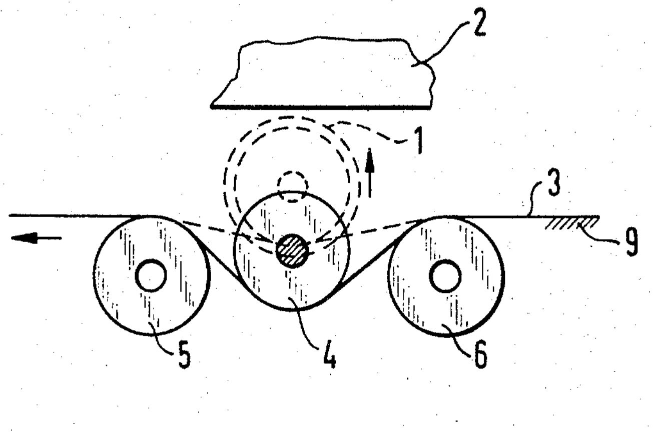
FIG. 4 illustrates a principal view of the type impression of the apparatus which is illustrated in greater detail in FIG. 5.
Figure 5:
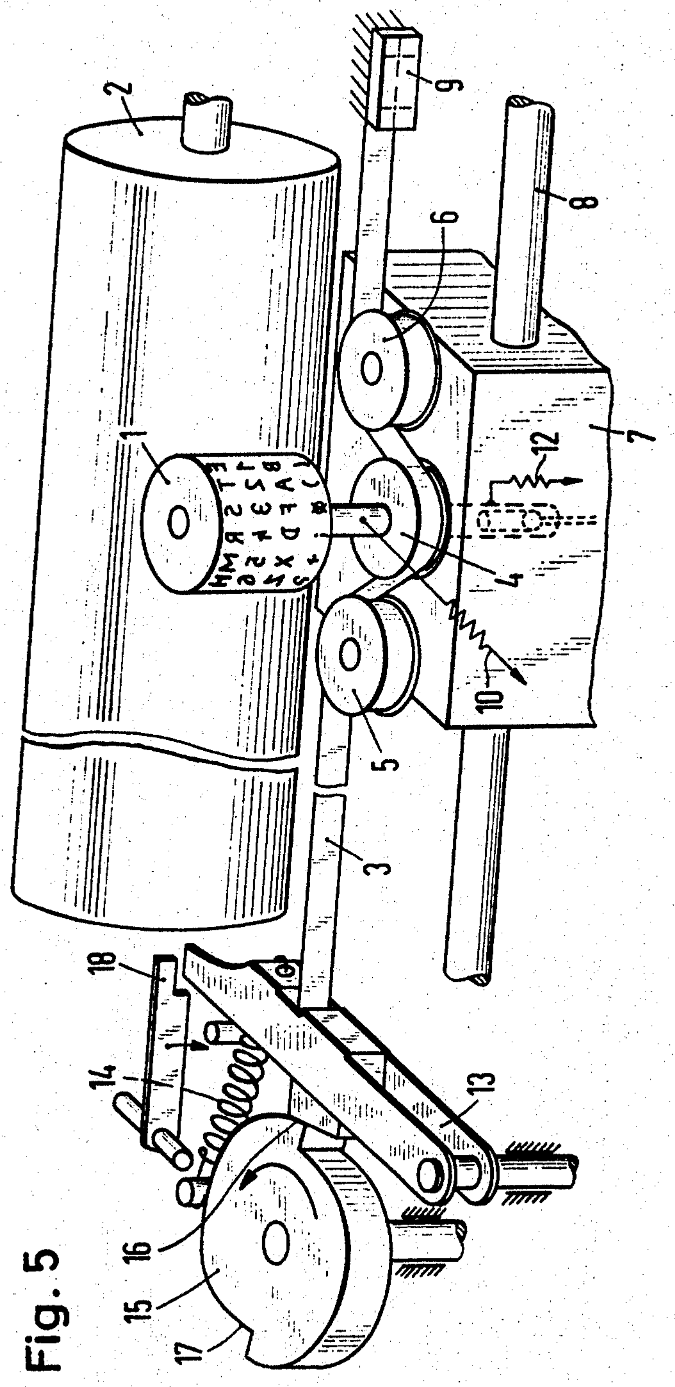
FIG. 5 is a simplified perspective representation, particularly of the printing drive of a type roller printer and of the apparatus for suppressing the impression.

The conditions occurring in the case of a parity-disturbing transmission interference in a teleprinter having seven code stages with an eighth stage as a parity stage, will be explained for the sake of introduction and for better explanation of conditions in conjunction with the type of impression device illustrated in FIGS. 4 and 5. A type roller 1 which is adjustable by way of a path sum gear (not shown) effects upon printing the selected type a nod-like movement toward the writing support 2. More particularly, as clearly shown in FIG. 4, this movement of the type roller 1 is introduced by a jerk-like pull at the left end of a tape 3 which extends substantially parallel with the line. As a result, the tape loop formed about a roller 4 on the shaft of the type roller 1 and between two reversing rollers 5 and 6 on a type carrier carriage 7 is shortened and the type carrier 1 is thus accelerated in the direction toward the writing point (position of tape pull and of type carrier 1 shown in broken lines in FIG. 4). To obtain a neat impression, the type carrier 1 travels a remaining path as far as the recording carrier is guided on the writing roller 2 in a free flight. Naturally, a ribbon must be located ahead of the recording carrier, but has been left out of the drawing. The type carrier carriage is displaceable on a rail 8 which extends parallel with the line. A tape 3 is fixed stationary at its right-hand end by a device 9 and the return of the tape to its reposing position (see position shown in solid lines of the roller 4 in FIG. 4), is caused by a spring 10 which engages the shaft of the type carrier 1. The pivoting point of the type roller axis is indicated at 11. A spring 12 pulls the type roller 1 into the lower resting position. The left end of the ribbon or tape 3 is fastened near the free end of a pivotally mounted lever 13. The lever 13 is shackled by a spring member 14 at a curved disk 15. The curved disk or cam 15 has two equivalent curve tracks following each other with one curve summit 16 and one curve trough 17 for each of the curve tracks. The rear flank (trailing edge) of the curved track from the curve top 16 to the subsequent curve trough 17 is oriented radially. The spring member 14 is tensioned by way of the curve path extending from the curve trough 17 to the curve top 16 in coaction with the lever 13 which said spring member engages. If the curve top 16 has been passed, the lever 13 drops at the radially oriented rear flank of the curve path into the curve trough 17 by the effect of the spring member 14, whereby a short powerful traction impulse is exerted upon traction tape 3. As a result of this traction impulse, the loop of the traction tape 3 formed about the roller 4 of the type carrier 1 and between both reversing rolls 5, 6 on the type carrier carriage 7 is shortened in the aforementioned manner. If, as is the case with most special functions, such as a space, there shall be no type impression, although the cam 15 continues to be propelled regularly, a latch lever 18 is pivoted ahead of a free end of the lever 13 by way of control elements to be explained below so that the lever 13 is prevented from dropping on the cam 15 from the curve top 16 into the curve trough 17; consequently, no traction force is exerted on the tape 3.

It is of particular importance for the embodiment of the invention that in teleprinters generally usable, special function evaluators be provided which, for example, for the command "space" automatically cause prevention of an impression movement, for example, of the type carrier provided in this embodiment or of a correspondingly differently designed component (type lever, type hammer or the like).

Figure 6:
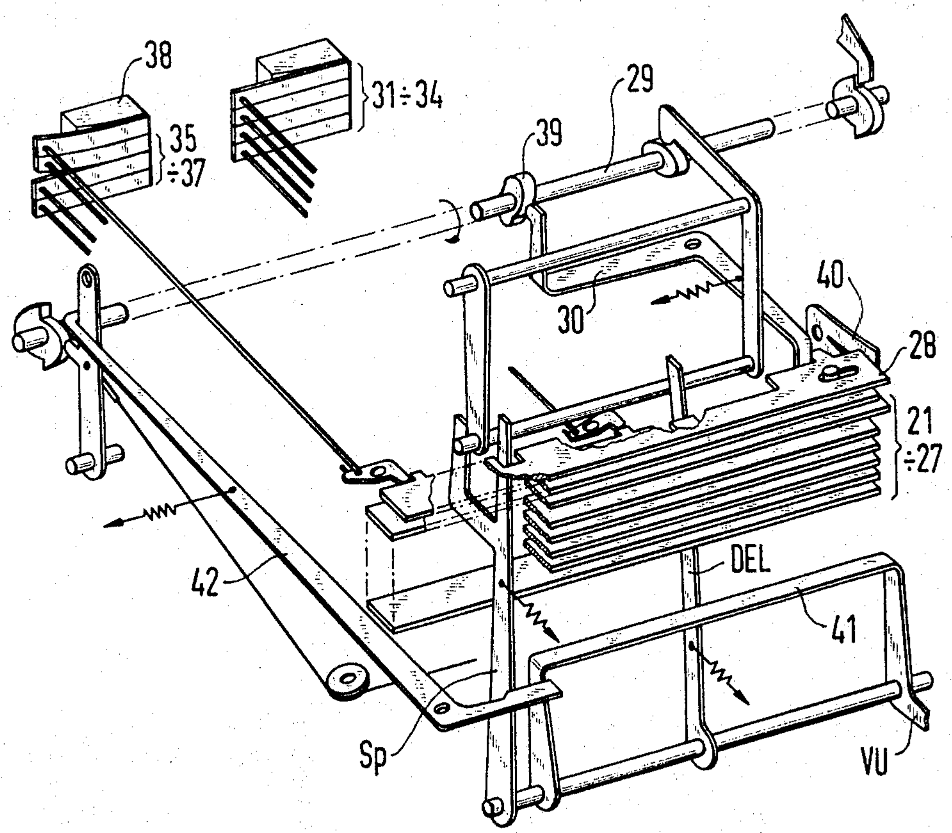
FIG. 6 is a perspective view of a portion of a special function evaluator which may be utilized in connection with the apparatus of FIG. 5.

In FIG. 6, a special function evaluator of the mechanical type appropriate for teleprinter symbols in accordance with the seven code CCITT requirement is illustrated. The evaluator is adjustable, for example, in parallel with a path sum gear for adjustment of the type roller by means of seven electromagnets 31–37 whereby the control lever St responsible for achieving a word space cam drop upon receipt of the associated teleprinter symbols into a row of recesses of seven parallel extending selector rails 21 to 27 after the print control has been released through the operation of a printer shaft 29. The printer shaft 29 is provided with adjustment cams and operates in the start-stop mode of operation. To be more specific, the arrangement is such that first all selector rails 21 to 27 are displaced to the right by cam control at the associated cams 39 and the spring shackled lever 30, and each selector rail is latched by energization of its associated electromagnet. Upon deenergization of an electromagnet, the associated selector rail is returned to the left by an associated tongue spring 40. In order to avoid prevention of the intended impression of a smear symbol via a lever 42, in the adjustment of "space" with a parity error stage, the lever 42 replacing the above-mentioned lever 18, an additional electromagnet may be provided in accordance with an embodiment of the invention (not shown in the drawing), said additional electromagnet being energized as a disturbed symbol is encountered and prevents either the incidence of the lever Sp or the blocking caused by way of an additional lever, for example the lever 18, for the impression.

A particularly appropriate solution, especially with the arrangement of an annex punch, is represented substantially in FIG. 6. Here, an additional electromagnet is controllable for the above-mentioned special function evaluator in response to the parity stage and coacts with an eighth selector rail 28. As shown with particular clarity in FIG. 7, the eighth selector rail 28 prevents with a wrong parity stage of the space symbol not only the imprint blocking by preventing the dropping in of lever Sp, but is also utilized to control the eighth track of the annex punch. Therefore, this symbol is identified conspicuously as disturbed in the associated punched tape without requiring in the punch an additional control magnet for the eighth track.

Figure 7:
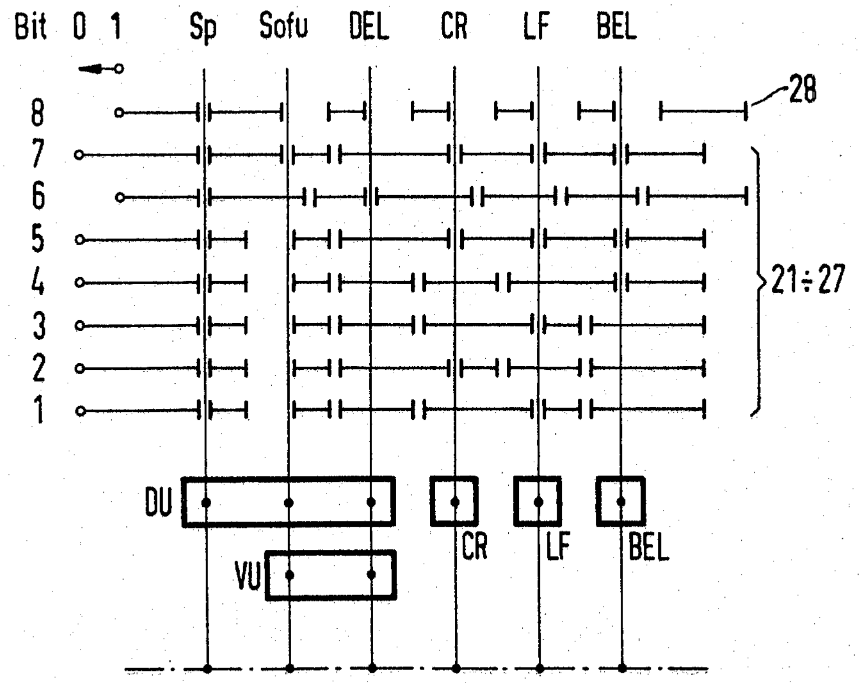
FIG. 7 is a diagrammatic illustration of the selective rail and control lever arrangement for the special function evaluator of FIG. 6 and in accordance with CCITT Code No. 5 with an eighth selector rail provided for the parity step.

FIGS. 6 and 7 represent the position for space with correct parity and thus for blocked impression. In the principal diagram of the special function evaluator according to FIG. 7, additional levers for additional special functions, such as DEL, CR, LF and BEL are illustrated. The Sofu lever incides with all special function symbols (bit 6 and 7=0) and prevents impression and feed. Only one such additional lever DEL is illustrated in FIG. 6 and this particular lever causes suppression of impression DU and suppression of feed VU by way of a bow structure 41.

Although I have described my invention by reference to specific illustrative embodiments thereof, many changes and modifications may become apparent to those skilled in the art without departing from the spirit and scope of my invention and it is to be understood that I intend to include within the patent warranted hereon all such changes and modifications as may reasonably and properly be included within the scope of my contribution to the art.

I claim:

1. Apparatus for indicating faulty code combinations in teleprinter transmissions by causing a teleprinter to print a special symbol, comprising a parity stage for receiving transmitted code combinations and parity values and operable to produce a signal in response to non-parity between the parity values and said code combinations, an electronic coding circuit for recoding a code combination in response to said signal to provide a special code combination composed of the code combination of an interspace and a binary value assigned to a non-parity condition, said teleprinter operated in response to said special code combination to print a special signal, and a tape puncher connected to receive said special code combination and operated thereby to store a code for said special signal on a tape.

2. Apparatus according to claim 1 comprising a receiving memory for storing the received code combinations, said electronic coding circuit including a plurality of gates having inputs connected to said receiving memory and to said parity stage, said teleprinter having a plurality of printing members, and amplifier means connecting the outputs of said plurality of gates with said printing members.

* * * * *